United States Patent [19]

Burrows

[11] Patent Number: 4,627,819

[45] Date of Patent: Dec. 9, 1986

[54] TEACHING OR AMUSEMENT APPARATUS

[75] Inventor: Roger I. Burrows, Manhattan Beach, Calif.

[73] Assignee: Price/Stern/Sloan Publishers, Inc., Los Angeles, Calif.

[21] Appl. No.: 793,705

[22] Filed: Oct. 31, 1985

Related U.S. Application Data

[63] Continuation-in-part of Ser. No. 697,973, Jan. 23, 1985, abandoned, which is a continuation of Ser. No. 478,680, Mar. 25, 1983, abandoned.

[51] Int. Cl.[4] .................................................. G09B 5/06
[52] U.S. Cl. .................................... 434/337; 235/462; 235/468; 235/489; 235/494; 382/12; 283/93; 283/94; 283/88; 283/901

[58] Field of Search ............... 235/465, 468, 469, 462, 235/494, 489, 454; 283/88, 93, 94, 901, 904; 434/331, 337; 382/9, 12, 26

[56] References Cited

U.S. PATENT DOCUMENTS 4,538,059  8/1985  Rudland .............................. 235/494
4,544,836  10/1985  Galvin et al. ........................ 283/904

Primary Examiner—Leo P. Picard
Attorney, Agent, or Firm—Abelman Frayne Rezac & Schwab

[57] ABSTRACT

A printed substrate has areas printed in a screen of carbon black ink dots and other areas printed in a corresponding screen of infrared transparent ink dots, whereby, the presence of the carbon black ink dots is made visually undetectable but can readily be detected by an infrared emitter and detector.

8 Claims, 3 Drawing Figures

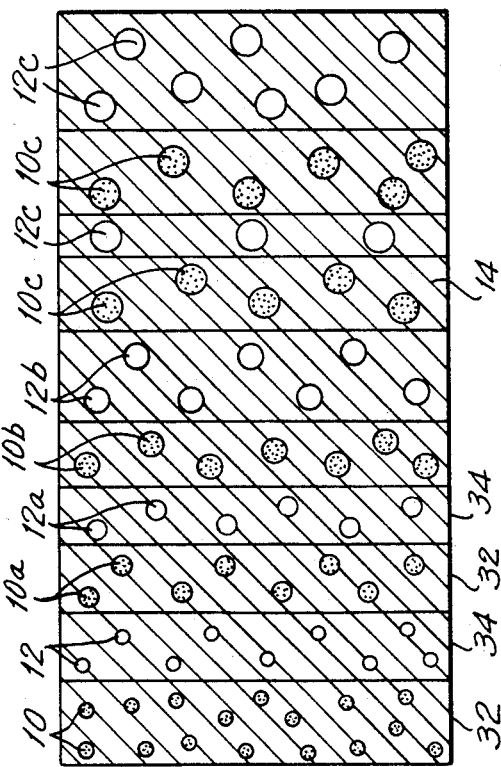

TEACHING OR AMUSEMENT APPARATUS

This application is a Continuation-In-Part of copending application Ser. No. 697,973, filed Jan. 23, 1985, which is a cont. of Ser. No. 478,680 filed 3/25/83 now abandoned, and assigned to a common assignee, the entire disclosure of which is incorporated herein by direct reference.

FIELD OF THE INVENTION

The present invention relates to a printed substrate in which first selected areas of the substrate provide a reflectance to infrared light greater than the reflectance to infrared light of second selected areas of the substrate, in order to provide for detection by an infrared scanner between said first and said second selected areas.

BACKGROUND OF THE INVENTION

The concept of printing selected areas of a document in an infrared absorptive carbon black ink, and printing other areas of the document in an infrared transparent simulated black ink is previously taught in Researach Disclosure, No. 160, August 1977, (Vants Hants) GB "Printed Documents and the Detection of Markings Thereupon". By using an appropriate infrared emitter and detector, differentiation can then be made between the respective areas, and lack of authenticity of the document can be determined bassed on deviations from the original of that document.

THE PRIOR DISCLOSURE

In the prior application Ser. No. 697,973 filed Jan. 23, 1985 as a Rule 60 Continuation of now abandoned parent application Ser. No. 478,680, filed Mar. 25, 1983, there is disclosed an apparatus for use as an aid in teaching, or, for the amusement of the user, the apparatus comprising a substrate having selected areas thereof printed in a screen of dots of infrared absorptive ink, and then overprinted with infrared transparent inks in such a manner as to minimize visual detection of the presence of the infrared absorptive ink dots. Other areas of the substrate are printed in screens of infrared transparent ink dots in order to complete the graphical or illustrative material on the substrate.

The substrate, when scanned by an appropriate infrared emitter and detector, thus produces a detectable drop in infrared reflectance at the selected areas, and thus enables differentiation by the scanning device between the said selected areas and the said other areas of the substrate. As a matter of convenience, carbon black ink is used as the infrared absorptive ink, carbon black ink providing significant infrared absorption, even when present in extremely small screens of 20% or less dot density.

Minimization of visual detection of the infrared absorptive ink is accomplished by printing the infrared absorptive ink in the form of a screen of minute dots in a density only barely sufficient to produce the required detectable drop in reflectance infrared. The screen of infrared absorptive ink dots is then overlaid by screens of up to maximum density of infrared transparent inks of selected hue and color, including infrared transparent black ink simulating carbon black ink.

By so doing, the visually detectable and distinctive difference is sheen or bloom of the relatively matte infrared absorptive ink from that of the relatively glossy infrared transparent inks is masked by the overprintings of the infrared transparent inks.

In the absence of such overprintings of infrared transparent inks, it is found that persons, including very young children, soon learn to differentiate between the respective selected and other areas by observing differences in reflected light glancing off the surfaces of the respective areas.

Despite the subterfuge of overprinting the screens of infrared absorptive ink dots with screens of infrared transparent inks, it has been found that visually acute persons are able to distinguish between the respective areas. This is so particularly in pale or brightly colored areas, and arises from the minor graying out of the colors in the selected areas produced by the underlying screen of carbon black ink dots, despite the minimal density and minimal actinic light absorptance of the carbon ink dots.

SUMMARY OF THE INVENTION

It is an object of this invention to provide a substrated of the type above referred to in which visual detection of and discrimination between the respective areas is further impeded, and the presence of the areas of different infrared reflectance and absorptance is further obfuscated.

According to the present invention, prior to the printing of the respective areas in screens of infrared transparent inks comprising the graphical or illustrative material, first selected areas are printed in the screen of infrared transparent simulated black ink dots in an identical or closely approximate screen to that employed in printing the carbon black ink dots in second selected areas. The substrate is then overprinted in screens of infrared transparent ink dots of various colors, hues and intensities to produce the desired representations on the substrate.

In this manner, visual differentiation is impeded between the grayed out second selected areas produced by the presence of the carbon black ink dots, and the grayed out first selected areas produced by the presence of the screens of infrared transparent simulated black ink dots. Visual differentiation between the respective areas is then even further impeded by the overprintings of the infrared transparent inks of the desired colors, hues and intensities.

By employing the teachings of the present invention, illustrations incorporating multiple choice pathways can be provided without the user being alerted to the correct pathway, in that the presence of the infrared absorptive ink dots in any particular area is obscured by the presence of infrared transparent ink dots in the adjacent areas comprising an incorrect pathway.

Further, according to the present invention multiple determined levels of infrared absorptance can be provided on the substrate, thus providing alternative responses from an infrared scanner when programmed for such multiple responses. Such scanners are well known in the art, and form no part of the present invention.

Further, by employing the present invention, answers to multiple choice questions can be coded to indicated, for example, correct, partially correct, or incorrect, depending on which one of the answers is selected by the user.

Further, the present invention finds particular application in providing an "invisible" bar code to be concealed within an illustration. The respective bars are printed in a screen of infrared absorptive carbon black ink dots, the spaces between the bars are printed in a corresponding screen of infrared transparent simulated black ink dots, and, the entire bar code is concealed at an appropriate location within the infrared transparent inks comprising the the illustration. These "invisible" bar codes can be employed to ativate a conventional voice synthesizer connected to the scanner. For example, an illustration of a duck incorporating an "invisible" bar code would synthesize the spoken work "duck" when appropriately scanned by the scanner. Alternatively, the "invisible" bar code could be incorporated into an illustration, for example, a question reading "what is this animal" would produce a response from the voice synthesizer stating that "this is a duck", or, a spelling of the word "duck" accompanied by a pronunciation of the word "duck".

Such bar codes have the potential of incorporating considerable more information than is contained by conventional bar codes, in that an additional variable can be provided by variation of the screen dot densities of the respective bars of the code.

A multitude of alternative uses of the invention suggest themselves, the above examples being in no way limitative as to specific uses of the invention.

The actual printing techniques to be used in the manufacture of the finished substrate of the present invention are entirely conventional multiple pass techniques. Typically, the screen of infrared absorptive dots will be the first printed in a single pass printing press, subsequent to which the screen of infrared transparent dots is printed, and, then the different colors of infrared transparent inks are overprinted on the substrate in a four pass press. Clearly, the substrate could be printed in a single printing, in the event that the press is a modern six pass press.

DESCRIPTION OF THE DRAWINGS

The invention will now be described with reference to the accompanying drawings, which illustrate preferred embodiments of the invention, and in which.

DESCRIPTION OF THE DRAWINGS

In each of the accompanying drawings, and for convenience of illustration, the respective screens of dots have been shown in greatly exaggerated form. The solid black circles 10 indicate discrete dots of infrared absorptive carbon black ink, and the open circles 12 indicate a corresponding screen density of infrared transparent non-carbon simulated black ink dots, or, dots of infrared transparent ink incorporating an amount of carbon black insufficient to cause activiation of an infrared scanner. The multiple overprintings of infrared transparent colored inks are indicated by the cross matchings 14.

Figure 1:
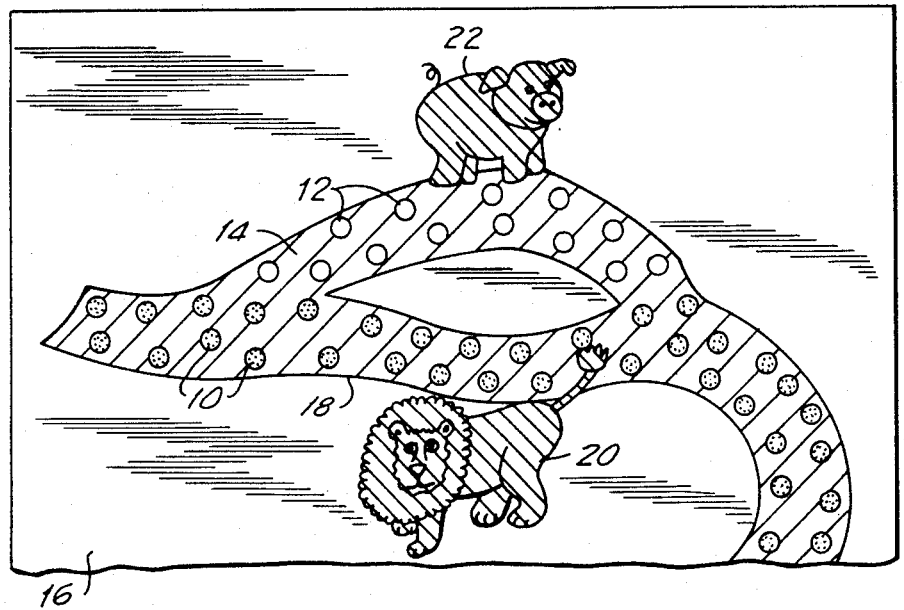
FIG. 1 is an illustration of a substrate according to the present invention incorporating a multiple choice pathway.

Referring now to FIG. 1, an illustration is provided on a substrate 16 which includes a pathway 18, on which are superimposed illustrations of animals 20. A typical question which would accompany this illustration would be "which animals make these sounds". Those representations of animals indicating the correct sounds are interconnected by the pathway 18 which incoporates an underprinted screen of carbon black ink dots 10. The incorrect representations 22 are interconnected by a pathway 24 which is underprinted in a screen of infrared transparent ink dots 12, of or simulated black ink dots incorporating an amount of carbon black insufficient to cause activation of the infrared scanner to be employed with the substrate.

The respective screens can be of minimal intensity, and themselves not readily discernable by the human eye, screen densities of less than 20%, and typically 10% to 15% being sufficient to activate currently available scanners, such as those identified under the trademark Questron. The term percentage is used in the printing industry to indicate the sum of the areas of the ink dots produced by a printing screen per unit area of printing screen. Additionally, when using an appropriate scanner having multiple levels of sensitivity, by selection of appropriate dot densities in specific areas of the substrate, such as 10% or less, 10%-20%, 20-50%, 50%-80%, and more than 80%, the substrate can be caused to activate the scanner at any one of its multiple levels of sensitivity, in order to give a response from the scanner corresponding with the specific dot density being scanned by the scanner. The increase in dot density in specific areas and the corresponding variations from almost undiscernable silver gray to almost pure black, is of little visually observed consequence, in that the increase of graying produced by the carbon black ink dots at increasing screen densities is visually offset by a corresponding increase in graying produced by the simulated black infrared transparent ink dots in adjacent areas, thus retaining the capability of obfuscating the presence of carbon black in any particular selected area.

The respective representations of the animals 20 and 22 and the pathways 18 and 24 are then overprinted in at least one and preferably multiple screens of infrared transparent inks of appropriate hue, color and intensity, in order to visually conceal the presence of the underlying screens of infrared absorptive and infrared transparent ink dots.

In the absence of the underlying screen of infrared transparent simulated black ink dots, it is found that even young children can distinguish between the optically brighter colors within the infrared transparent pathway 24, as compared with the visually duller or grayed out pathway 18 incorporating the screen of infrared absorptive carbon black ink dots.

As will be readily apparent, should the user follow the wrong path with the infrared scanner, immediatley upon entering the confines of the pathway 24, the infrared scanner will receive an increased amount of reflected infrared light, causing the scanner to react correspondingly with a negative indication corresponding with an incorrect answer.

Figure 2:
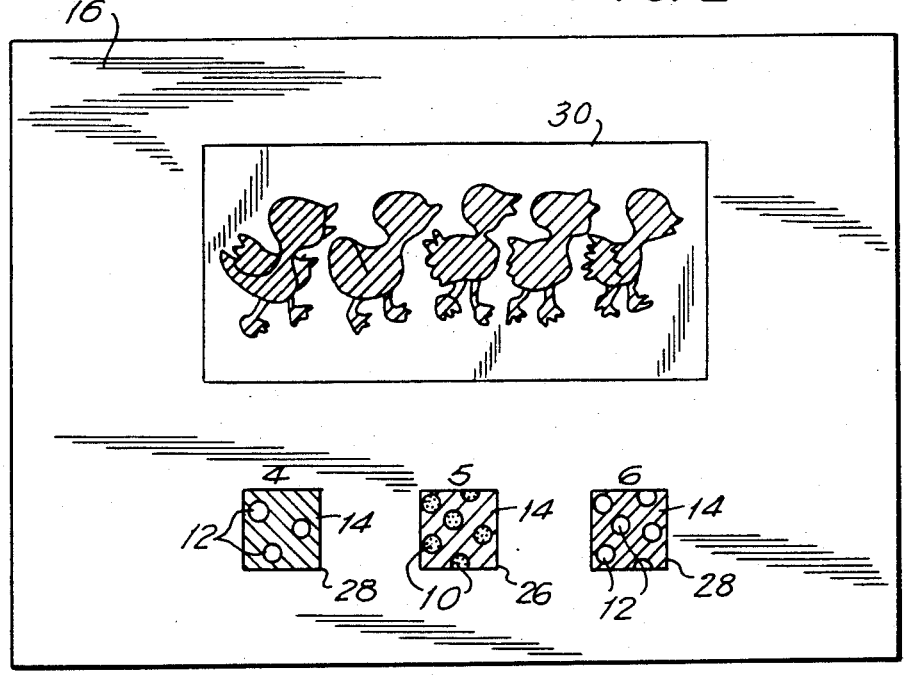
FIG. 2 is an illustration of a substrate according to the invention incorporating typical multiple choice question; and, FIG. 3 illustrates the manner in which "invisible" bar codes can be incorporated into the substrate.

In FIG. 2, multiple choice answers are provided, only one of which is correct, to a typical question "how many chickens are there". The block 26 corresponding with the correct answer is underprinted with a screen of infrared absoptive carbon black ink dots. The blocks 28 corresponding with incorrect answers are underprinted with a corresponding screen of infrared transparent simulated black ink dots. The respective blocks 26 and 28 and the illustration 30 of the chickens are each then overprinted in appropriate colored infrared transparent inks.

The organization of pathways of FIG. 1 readily lends itself to the incorporation into the pathways of "invisible" bar codes, which, when employed in conjunction with a scanner connected to an appropriate synthesizer can give verbal or other comment such as "that is wrong", or a clown's laughter, or, reassurance to the user such as "that is correct" or applause. Incorporation of an "invisible" code into the pathways can be used to give an indication of the noise made by an animal, such as a dog's bark, a cats meow, the clucking of a chicken, a chipmunks chatter, or the like.

While the invention so far described has been related to a teaching or amusement apparatus, the invention finds equal applicability in other applications in the provision of "invisible" bar codes, the presence of which can only be directed using sophisticated equipment.

Such an "invisible" bar code is illustrated in FIG. 3, and, comprises bars 32 of a screen of infrared absorbant carbon black ink dots 10. The spaces 34 between the respective bars 32 are filled with a screen of infrared tranparent simulated black ink dots 12 simulating the bars 32 in density and grayness, thus rendering the bars 32 and spaces 34 of the bar code visually indistinguishable from each other, but, readily readable by an appropriate infrared bar code scanner. Such an "invisible" bar code, when overlaid with one or more additional infrared transparent printings, then becomes entirely visually undiscernable.

Such an application finds particular utility in coding legitimately printed material, in order that it may be readily distinguished from counterfeites of that printed material. Such an application also finds particular utilty, for example, in printed lables, tags, or the like to be attached to articles of manufacture, or, in the printing of boxes, cartons and the like as a deterrent to counterfeiting.

Also, and as illustrated in FIG. 3, the respective bars and spaces, while printed in the same screens of dots, can be printed in different screen sizes or varied as to the percentage area or density of the dots. The dots 10, 10a, 10b, 10c of the bars 32 are shown of progressively increasing percentage area, as are the dots 12, 12a, 12b, 12c of the spaces 34. In this way the relatively limited information in the bar code can be multiplied by two ore more, depending on the number of levels of sensitivity of the scanner, which readily can be provided with low, medium, and high sensitivity levels for a threefold multiplication of the information in the bar code. In the event that the bar code is to be employed for activating a voice synthesizer, considerably more information can be supplied to the synthesizer, with the possibility of greater versatility of the synthesized voice.

Typically, carbon black will be used as the infrared absorptive constitutent of the infrared absorptive ink. Such inks typically produce a somewhat matte finish due to the presence of the carbon black in particulate form. Also, typically, the infrared transparent inks will incorporate soluble dyes, such as analine dyes in solution with the vehicle of the ink. Such dyes do not have particle size, and, thus the ink has the same sheen or gloss as that of the vehicle, there being no particulate matter incorporated into the ink. Admixtures of particulate matter can be incorporated into infrared transparent inks, such as finely powdered silica. Such additions are however, found to be undesirable and unnecessray when following the teachings of the present invention.

Infrared transparent simulated black inks are well known in the art, and typically are comprised of admixtures of blue, magenta and yellow in high concentrations.

It will be understood that the embodiments described above are given by way of illustration only, and, that various modifications may be made without departing from the scope of the invention as defined in the following claims.

I claim:

1. In an apparatus for use in amusement, manual coordination, teaching, educational evaluation and related purposes, said apparatus comprising a substrate for use in conjunction with a manually manipulatable infrared emitting and infrared reflectance measuring scanning device:

said substrate being of the type comprising:
  a sheet of material having determined transparency and reflectivity to infrared illumination and having opposed major planar surfaces;
  printed matter of any desired hue, color, intensity and organization applied to said substrate in first determined areas, and printed matter of any desired hue, color, intensity and organization applied to said substrate in second determined areas separate from said first determined areas, said respective printings of printed matter including:
  at least one printing within the extent of said first determined areas comprised of infrared transparent ink having insufficient carbon black content to cause detection of absorption of infrared light when said first determined areas are illuminated with infrared light by a scanning device and scanned by the scanning device;
  at least one printing within the extent of said second determined areas composed of infrared transparent ink together with carbon black in a sufficient minor quantity to cause detection of absorption of infrared light above a determined threshold when said second determined areas are illuminated with infrared light by said scanner and scanned by said scanner;
  the carbon black included in said at least one printing of said second determined areas being dispersed substantially uniformly throughout the entire extent of said areas, and being present in insufficient quantity to enable visual detection of the presence of said carbon black;
  the color, hue and intensity of the infrared transparent ink included in said at least one printing of said second determined areas being selected to intentionally visually obscure and obfuscate the presence of carbon black within the printing of said second determined areas,
the improvement comprising:
  said carbon black in said second areas being printed in a screen of dots;
  said first areas being printed in a screen of dots closely approximating said screen of carbon black ink dots in said second areas, but in an infrared transparent simulated black ink;
  each of said first and second areas being over printed with infrared transparent inks of desired color, hue and intensity.

2. The apparatus of claim 1, in which said substrate further includes a bar code printed in said screen of carbon black ink dots, the intervening spaces between the bars of said code being printed in said screen of infrared transparent simulated black ink dots, said bar code and spaces being over printed in said infrared transparent inks.

3. The apparatus of claim 2, in which selected ones of said bars and spaces differ in percentage area of the respective dots.

4. In an apparatus incorporating an infrared reflective substrate having first selected areas printed in infrared absorptive carbon black ink and second selected areas printed in infrared transparent ink, the improvement comprising:
said first areas comprising bars of a bar code, said bars each being printed in a determined screen of carbon black ink dots;
said second areas comprising spaces between said bars of said bar code and each being printed in a screen corresponding with said determined screen in said first areas, but in infrared transparent simulated black ink dots;
whereby said bars and said spaces are rendered visually indistinguishable from each other, but are readily distinguishable from each other by an infrared emitting and reflectance measuring device.

5. The apparatus of claim 4, in which first and second areas are further concealed by overprintings of infrared transparent inks.

6. The apparatus of claim 4, in which selected bars of said bar code are printed in a first screen of one density, and other bars of said bar code are printed in other screens of a density different from said first screen.

7. The apparatus of claim 5, in which spaces between said selected bars are printed in a screen density closely approximating said first screen in density, and in which spaces between said other bars are printed in screen densities closely approximating the screen density of the adjacent bars.

8. The apparatus of claim 7, in which the entire said bar code is overprinted in infrared transparent simulated black ink.

* * * * *